United States Patent
Nishiki et al.

(10) Patent No.: US 11,028,270 B2
(45) Date of Patent: Jun. 8, 2021

(54) BLACK MATRIX COMPOSITION, BLACK MATRIX, AND BLACK MATRIX PRODUCTION METHOD

(71) Applicants: Sharp Corporation, Sakai (JP); Ridgefield Acquisition, Luxembourg (LU)

(72) Inventors: Hirohiko Nishiki, Sakai (JP); Tohru Okabe, Sakai (JP); Izumi Ishida, Sakai (JP); Shogo Murashige, Sakai (JP); Atsuko Noya, Kakegawa (JP); Toshiaki Nonaka, Tokyo (JP); Naofumi Yoshida, Kakegawa (JP)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 16/467,246

(22) PCT Filed: Dec. 7, 2017

(86) PCT No.: PCT/JP2017/043918
§ 371 (c)(1),
(2) Date: Jun. 6, 2019

(87) PCT Pub. No.: WO2018/105679
PCT Pub. Date: Jun. 14, 2018

(65) Prior Publication Data
US 2020/0277494 A1    Sep. 3, 2020

(30) Foreign Application Priority Data
Dec. 8, 2016 (JP) .................. 2016-238627

(51) Int. Cl.
| | |
|---|---|
| *C08L 83/06* | (2006.01) |
| *C08K 3/04* | (2006.01) |
| *C08K 3/36* | (2006.01) |
| *C08K 9/06* | (2006.01) |
| *C09C 1/48* | (2006.01) |

(52) U.S. Cl.
CPC .............. *C08L 83/06* (2013.01); *C08K 3/04* (2013.01); *C08K 3/36* (2013.01); *C08K 9/06* (2013.01); *C09C 1/48* (2013.01); *C08K 2201/003* (2013.01)

(58) Field of Classification Search
CPC .. C08L 83/06; C09C 1/48; C08K 3/04; C08K 3/36; C08K 9/06
USPC ........................................................ 524/495
See application file for complete search history.

(56) References Cited

U.S. PATENT DOCUMENTS

| | | | |
|---|---|---|---|
| 6,407,782 B1 | 6/2002 | Kim | |
| 2015/0378182 A1* | 12/2015 | Shin | .................... H01L 29/7869 |
| | | | 257/40 |

FOREIGN PATENT DOCUMENTS

| CN | 1119693 | * | 10/1997 |
|---|---|---|---|
| JP | H0873800 A | | 3/1996 |
| JP | H10204321 A | | 8/1998 |
| JP | 2000143985 A | | 5/2000 |
| JP | 2002285007 A | | 10/2002 |
| JP | 2004292672 A | | 10/2004 |
| JP | 2008150428 A | | 7/2008 |
| JP | 2008164985 A | | 7/2008 |
| JP | 2008208342 A | | 9/2008 |
| JP | 2008242078 A | | 10/2008 |
| JP | 2009206197 A | | 9/2009 |
| JP | 2011257635 A | | 12/2011 |
| JP | 2016143062 A | | 8/2016 |

OTHER PUBLICATIONS

International Search Report for PCT/JP2017/043918 dated Feb. 27, 2018.
Written Opinion of the International Searching Authority for PCT/JP2017/043918 dated Feb. 27, 2018.

* cited by examiner

*Primary Examiner* — Deve V Hall
(74) *Attorney, Agent, or Firm* — Faegre Drinker Biddle & Reath LLP (57) ABSTRACT

[Problem] To provide a composition for a black matrix which is a material suitable for manufacturing a black matrix, which is suitable for a high luminance display device structure and has high heat resistance and high light-shielding properties.
[Means for Solution] The present invention uses a composition for a black matrix comprising: (I) a black colorant containing carbon black having a volume average particle diameter of 1 to 300 nm; (II) a siloxane polymer to be obtained by hydrolyzing and condensing a silane compound represented by a prescribed formula in the presence of an acidic or basic catalyst; (III) surface modified silica fine particles; (IV) a thermal base generator; and (V) a solvent.

7 Claims, 1 Drawing Sheet

BLACK MATRIX COMPOSITION, BLACK MATRIX, AND BLACK MATRIX PRODUCTION METHOD

CROSS-REFERENCE TO RELATED APPLICATIONS

This application is a national stage application (under 35 U.S.C. § 371) of PCT/JP2017/043918, filed Dec. 7, 2017, which claims benefit of Japanese Application No. 2016-238627, filed Dec. 8, 2016.

BACKGROUND OF THE INVENTION

Technical Field

The present invention relates to a composition for a black matrix. Further, the present invention also relates to a black matrix formed from the composition for a black matrix. Further, the present invention also relates to a method for manufacturing a black matrix from the composition for a black matrix.

Background Art

As a black matrix for a color filter used for a color display device, a black matrix prepared by dispersing a light-shielding black pigment such as carbon black in a high molecular polymer such as acrylic resin, epoxy resin, polyimide resin or the like using a dispersing agent to prepare a liquid composition, and by applying, curing and patterning the resulting composition has been usually used. A black matrix is used, for example, in a liquid crystal display device, to prevent light leakage between pixels which do not carry out switching and to maintain high contrast. In addition, since leakage current due to photo-excitation occurs when an amorphous silicon or an oxide semiconductor is exposed to light, the leakage current is suppressed by light-shielding the thin film transistor portion with a black matrix layer.

As the composition for a black matrix to be used for such an object, various proposals have been made. For example, a carbon black dispersion that achieves both high OD value and high electric insulation using a dispersion containing carbon black having a primary particle size of 20 to 30 nm and a specific organic compound has been proposed (see Patent Document 1). Further, an improvement of the light-shielding properties by mixing a conductive carbon black with a titanium oxide pigment has been also proposed (see Patent Document 2). Furthermore, an insulating black pigment composition comprising a composite metal oxide pigment made of an electrically insulating metal oxide instead of a conductive carbon black has been proposed (see Patent Document 3). Further, through using a composition in which titanium oxynitride is dispersed in polyimide resin, a black matrix having a stable electric insulating properties has been proposed (see Patent Document 4).

Furthermore, a composition for a black matrix comprising siloxane polymer has been proposed. For example, it has been proposed to improve adhesion and solvent resistance by blending a siloxane oligomer having a specific functional group to a radiation-sensitive composition for forming a colored layer, which is used for a color filter, and by curing with radiation after coating (see Patent Document 5). Further, it has been proposed to obtain a film having good transparency, planarity and water penetration resistance using, as a protective film for a color filter, siloxane polymer obtained by hydrolytic condensation of a silane monomer having an acid anhydride group in its side chain (see Patent Document 6). Furthermore, taking advantage of the high light-shielding properties of carbon black, as a method for obtaining a high electric resistance value while using a conductive carbon black, a colorant having a structure, in which silica is encapsulated in carbon black, has been proposed (see Patent Document 7). As other example, in which an improvement was added to colorant, titanium black particles and the like, whose surface is coated with silica fine particles, have been also proposed (see Patent Document 8). Besides, as a coloring composition for a color filter, it has been proposed to achieve high contrast by blending a coloring pigment and silica particles (see Patent Document 9).

Further, in particular with the advance of high resolution of the mobile display, the problem that the display pixel area becomes smaller has been actualized. Factors that the display pixel area is limited include a wiring, a thin film transistor and auxiliary capacitance, as well as a black matrix to cover these, and the like. Among these, the display pixel area is limited by a black matrix formed on a color filter substrate bonded to an array substrate, on which a transistor is formed.

Due to the redundant design required for bonding an array substrate and a color filter substrate, the display pixel area is further limited. For such a problem, a method for providing a substrate for a display device having high transmittance by forming a black matrix on an array side substrate, then planarizing with a transparent material such as BCB (registered trademark, manufactured by Dow Chemical), and thereafter forming a thin film transistor thereon has been proposed (see Patent Document 10).

PRIOR ART DOCUMENTS

Patent Documents

[Patent document 1] JP 2004-292672 A
[Patent document 2] JP H8-73800 A
[Patent document 3] JP H10-204321 A
[Patent document 4] JP 2000-143985 A
[Patent document 5] JP 2008-242078 A
[Patent document 6] JP 2008-208342 A
[Patent Document 7] JP 2008-150428 A
[Patent Document 8] JP 2002-285007 A
[Patent Document 9] JP 2008-164985 A
[Patent Document 10] U.S. Pat. No. 6,407,782

SUMMARY OF THE INVENTION

Problems to be Solved by the Invention

When a black matrix is formed on an array side substrate, a black matrix material having high heat resistance is required. Here, in general, carbon black having high light-shielding properties is widely used as a black pigment in a composition for a black matrix, but since carbon black has high conductivity, a dispersing agent based on an organic material is generally used in order to suppress this conductivity. Since such a dispersing agent based on an organic material has low heat resistance, a problem may cause, which is that the light-shielding properties and insulating properties of the black matrix itself deteriorate due to thermal decomposition of the dispersing agent. Therefore, thermal stability of the dispersing agent is reflected to the heat resistance of the black matrix. Further, since an insulating black pigment in place of carbon black is inferior in light-shielding properties, further excellent dispersing agent is required when using such a black pigment. Therefore, even when using no carbon black, increasing the thermal stability of the dispersing agent is required to improve the heat resistance of the black matrix.

In addition to the thermal stability of dispersing agent, the thermal stability of binder polymer is also an important factor for improving the heat resistance of black matrix. As polymer materials for binder, acrylic resin, epoxy resin, and further polyimide resin as a heat resistant resin have been proposed; however, when a thin film transistor is formed on a black matrix, pyrolysis and outgas may become a problem even if they are trace. Siloxane polymer is a polymer excellent in transparency and heat resistance and can improve heat resistance of the black matrix when compared to epoxy resin or polyimide resin. However, even when using siloxane polymer, there is a possibility that a dispersing agent is decomposed at 300° C. or higher.

The present invention has been made based on the above-mentioned circumstances, and it is an object of the present invention to provide a composition for a black matrix suitable for manufacturing a black matrix, which is suitable for a high luminance display device structure and has high heat resistance and high light-shielding properties. Furthermore, the present invention is to provide a black matrix having high light-shielding properties, resistance to high temperature, and stable and high electric resistance.

Here, the present inventors obtained an unexpected knowledge that through using a composition for a black matrix comprising a black colorant comprising carbon black having a volume average particle diameter of 1 to 300 nm, a siloxane polymer, surface modified silica fine particles, a thermal base generator and a solvent, a black matrix having high light-shielding properties and heat resistance can be formed while maintaining high electric resistance, even when carbon black having high conductivity is used as the black colorant. The present invention has been made based on this knowledge.

Means for Solving the Problems

The composition for a black matrix according to the present invention comprises:

(I) a black colorant comprising carbon black having a volume average particle diameter of 1 to 300 nm, (II) a siloxane polymer having repeating units represented by the general formulae (Ia), (Ib) and/or (Ic)

(wherein
$R^1$ is a linear, branched or cyclic, alkyl group or alkenyl group having 1 to 10 carbon atoms or an aryl group having 6 to 20 carbon atoms, where one or more methylene may be replaced by oxygen, or one or more hydrogen may be replaced by fluorine,
the ratio x of the general formula (Ia) in all of the repeating units is 0 mol % or more and 30 mol % or less, the ratio y of the general formula (Ib) in all of the repeating units is 50 mol % or more and 1.00 mol % or less, and the ratio z of the general formula (Ic) in all of the repeating units is 0 mol % or more and 30 mol % or less);

(III) surface modified silica fine particles having, on at least a part of the surface, a functional group represented by the general formula (3):

$$—(O)_k SiR^3{}_m(OR^5)_l \qquad (3)$$

(wherein
$R^3$ represents a linear, branched or cyclic, alkyl group or alkenyl group having 1 to 20 carbon atoms or an aryl group having 6 to 20 carbon atoms, where one or more methylene may be replaced by oxygen, or one or more hydrogen may be replaced by fluorine,
$R^5$ represents hydrogen or an alkyl group having 1 to 10 carbon atoms,
$k+l+m=4$, $k=1$ to 3, and $m=0$ to 3)
and having a volume average particle diameter of 1 to 300 nm;

(IV) a thermal base generator, and (V) a solvent.

The method for manufacturing a black matrix according to the present invention comprises applying the composition described above and curing.

The black matrix according to the invention is characterized in that it is formed by applying the composition described above and curing.

Effects of the Invention

According to the present invention, it is possible to provide a composition suitable for manufacturing a black matrix, which is suitable for a high luminance display device structure and has high heat resistance and high light-shielding properties. By enhancing heat resistance, it becomes possible to form the black matrix, which has conventionally been formed on a color filter substrate, on a thin film transistor array substrate. This makes it possible to reduce the necessity of redundant design for black matrix, which has conventionally been conducted to secure the margin for bonding a color filter substrate to a thin film transistor array substrate. Furthermore, a problem that a screen becomes dark due to decrease of the display area of liquid crystal or organic electroluminescence (OLED), which has been a problem in high definition panel design, can be solved and the increase in power consumption can also be suppressed.

DETAILED DESCRIPTION OF THE INVENTION

Mode for Carrying Out the Invention

[Composition for Black Matrix]

The composition for a black matrix according to the present invention comprises (I) a black colorant, (II) a siloxane polymer, (III) surface modified silica fine particles, (IV) a thermal base generator, and (V) a solvent. Each of the components is described below in detail.

<(I) Black Colorant>

The black colorant used in the present invention comprises carbon black. As the carbon black, furnace black, channel black, acetylene black, thermal black, and lamp black etc. can be used.

The carbon black comprised in the black colorant used in the present invention has a volume average particle diameter of 1 to 300 nm, preferably 50 to 150 nm. By setting a volume average particlie diameter of the black colorant within this range, good light-shielding properties is obtained. In addition, conforming to dynamic light scattering method (DLS: Dynamic Light Scattering), such a volume average particle diameter can be measured by the apparatus of Nanotrac particle size analyzer manufactured by Nikkiso Co., Ltd. and the like.

The black colorant used in the present invention can be also used further in combination with a dispersing agent. The dispersing agent is not particularly limited if it improves dispersibility of carbon black, and, for example, an organic compound-based dispersing agent such as the polymeric dispersing agent described in JP 2004-292672 A may be used. Those containing carbon black and commercially available include TSBK-007 (trade name, manufactured by Taisei Kako Co., Ltd.) and the like.

<(II) Siloxane Polymer>

The siloxane polymer refers to a polymer having a Si—O—Si bond (siloxane bond) as a main chain. Depending on the number of oxygen atoms bonded to a silicon atom, the skeleton structure of the siloxane polymer can be classified as follows: a silicone skeleton (the number of oxygen atoms bonded to a silicon atom is 2); a silsesquioxane skeleton (the number of oxygen atoms bonded to a silicon atom is 3); and a silica skeleton (the number of oxygen atoms bonded to a silicon atom is 4). In the present invention, these skeleton structures of the siloxane polymer are primarily composed of a silsesquioxane skeleton and may be a combination of plural types. When the silicone structure is numerous, the siloxane polymer tends to be easily broken at high temperature. In particular, based on the reason that in the case of heating and curing, the curing reaction at the time of film forming easily proceeds and good handling properties such as less stickiness after coating can be obtained, a silsesquioxane structure or a mixture of a silsesquioxane structure and a silica structure is preferred. Further, when the silica structure is numerous, stability is low, and the composition tends to thicken.

The siloxane polymer used in the present invention is one having repeating units represented by the general formulae (Ia), (Ib) and/or (Ic)

(wherein
$R^1$ is a linear, branched or cyclic, alkyl group or alkenyl group having 1 to 10 carbon atoms or an aryl group having 6 to 20 carbon atoms, where one or more methylene may be replaced by oxygen, or one or more hydrogen may be replaced by fluorine,
the ratio x of the general formula (Ia) in all of the repeating units is 0 mol % or more and 30 mol % or less, the ratio y of the general formula (Ib) in all of the repeating units is 50 mol % or more and 100 mol % or less, and the ratio z of the general formula (Ic) in all of the repeating units is 0 mol % or more and 30 mol % or less).

In the above general formula, specific examples of the substituent $R^1$ include (i) a substituted or unsubstituted alkyl group, such as methyl group, ethyl group, n-propyl group, isopropyl group, n-butyl group, t-butyl group, n-hexyl group, n-decyl group, trifluoromethyl group, 2,2,2-trifluoroethyl group, 3,3,3-trifluoropropyl group, 3-hydroxypropyl group, 3-glycidoxypropyl group, 2-(3,4-epoxycyclohexyl)ethyl group, 3-aminopropyl group, 3-mercaptopropyl group, 3-isocyanate propyl group, 4-hydroxy-5-(p-hydroxyphenylcarbonyloxy)pentyl group and 3-acryloxypropyl group, (ii) a substituted or unsubstituted cycloalkyl group, such as cyclopropyl group, cyclobutyl group, cyclopentyl group and cyclohexyl group, (iii) a substituted or unsubstituted aralkyl groups, such as phenyl isopropyl group, and (iv) a substituted or unsubstituted aryl group, such as phenyl group, tolyl group, p-hydroxyphenyl group and naphthyl group.

The mass average molecular weight of the siloxane polymer is appropriately selected depending on concentration of the composition, content of the functional group contained in the siloxane polymer, and the like. However, in order to suppress scum after developing the coated film containing a photosensitive composition and to increase photosensitivity, the mass average molecular weight is preferably lower. Specifically, when the photosensitive composition is a positive type photosensitive composition, the solubility of the exposed portion increases, so that the lower the molecular weight of the siloxane polymer is, the higher the photosensitivity of the photosensitive composition becomes, which is preferable. Further, when the photosensitive composition is a negative type photosensitive composition, the higher the solubility of the unexposed portion is, the higher the photosensitivity becomes, so that it is preferred that the mass average molecular weight of the siloxane polymer is lower.

On the other hand, in order to maintain the pattern shape after curing well, the molecular weight should not become excessively too low. From this viewpoint, the mass average molecular weight (Mw) of the siloxane polymer is preferably 500 to 10,000, more preferably 1,500 to 5,000. Here, the mass average molecular weight refers to a mass average molecular weight in terms of styrene according to the gel permeation chromatography.

The mass ratio of the black colorant to the siloxane polymer is determined by OD (optical density) that is requested as a black matrix. It is preferably within the range of the black colorant: the siloxane polymer=10:90 to 50:50. Here, the mass ratio means a solid content ratio. When the mass ratio is within this range, light-shielding properties and film strength are retained.

<(III) Surface Modified Silica Fine Particles>
Silica Fine Particles

In the composition for a black matrix according to the present invention, surface modified silica fine particles are used as a dispersing agent. Such surface modified silica fine particles can be obtained, for example, by modifying the surface of silica fine particles. In the present specification, the "fine particles" refer to those having a volume average particle diameter of 1 μm or less. In addition, conforming to dynamic light scattering method (DLS: Dynamic Light Scattering), such a volume average particle diameter can be measured by the apparatus of Nanotrac particle size analyzer manufactured by Nikkiso Co., Ltd. and the like.

The silica fine particles used in the present invention has a volume average particle diameter of 1 to 300 nm, preferably 20 to 200 nm. It is preferably the same degree as or smaller than the volume average particle diameter of the carbon black. By setting the volume average particle diameter of the silica fine particles used in the present invention within this range, good optical density and good electric insulation properties are obtained. When it is 300 nm or more, surface smoothness is lost and there is a possibility that a problem such as malfunction of the transistor is generated by light-scattering effect.

From the standpoint of maintaining light-shielding properties, it is preferred that refractive Index of the silica fine particles is close to that of the above-described siloxane polymer. Although not being bound by theory, it is thought that by setting the refractive index of the silica fine particles close to that of the siloxane polymer being present therearound, light scattering is suppressed, and this contributes to maintenance of light-shielding properties. Therefore, it is preferred that the difference between the refractive index of the silica fine particles and that of the siloxane polymer is within 0.2.

The ratio of the volume average particle diameter of the carbon black to that of the surface modified silica fine particles is preferably 1:0.05 to 1:3, preferably 1:0.2 to 1:2. Although not being bound by theory, it is thought that since the surface modified silica fine particles exist between particles of the carbon black in the composition for a black matrix, increase of conductivity due to aggregation of the carbon black each other is prevented. Therefore, by making the particle diameter of the surface modified silica fine particles close to or slightly smaller than that of the carbon black, aggregation of the carbon black each other can be more effectively prevented and conductivity can be maintained lower (electric resistance higher). Further, since aggregation of the carbon black particles is suppressed, it is thought that uniform and high light-shielding properties are achieved.

The mass ratio of the black colorant to the surface modified silica fine particles is in the range of the black colorant: the surface modified silica fine particles=10:90 to 90:10, preferably 30:70 to 70:30. When the mass ratio is within this range, both light-shielding properties and electric insulation are achieved and deterioration of insulation during heating can be prevented.

In addition, the above-described "the ratio of the volume average particle diameter of the carbon black to the volume average particle diameter of the surface modified silica fine particles" and "the mass ratio of the black colorant to the siloxane polymer" can be appropriately adjusted depending on degree of the required light-shielding properties (i.e., how much strong the light-shielding properties of the black matrix is desired to be made).

The silica particles used in the present invention include, for example, a dry silica obtained by a dry method such as a combustion method (also referred to as fumed silica), a wet silica obtained by a wet method such as a precipitation method, a gel method and a sol-gel method, and the like. Further, as the silica particles, a commercially available dry silica such as Reolosil (registered trademark) series manufactured by Tokuyama Corporation may be used.

Surface Modification of Silica Fine Particles

By modifying the surface of the silica fine particles as described above, the surface modified silica fine particles used in the present invention can be well dispersed in the siloxane polymer and the carbon black dispersion. Such surface modified silica fine particles can be obtained by doing as described below. First, a silica fine particle aqueous dispersion comprising silica fine particles and an aqueous dispersion medium is prepared. Here, the silica fine particle aqueous dispersion can be prepared by adding the silica fine particles to the aqueous dispersion medium and stirring. Alternatively, commercially available silica fine particle aqueous dispersion may be prepared. The aqueous dispersion medium used in the present invention is mainly composed of water and may contain small amount of other components as required, but the components other than water are preferably 30 mass % or less of the total.

Concentration of the silica fine particles in the silica fine particle aqueous dispersion can be appropriately selected, but it is preferably in the range of 5 to 40 mass %, more preferably in the range of 10 to 30 mass %.

Commercially available silica particles aqueous dispersions that can be used in the present invention include, for example, Kiebosol (registered trademark) series, manufactured by Merck Performance Materials K.K. (hereinafter abbreviated as Merck), Snowtex (registered trademark) series, manufactured by Nissan Chemical Corporation, Quartron (registered trademark) PLEASE series, manufactured by Fuso Chemical Co., Ltd., and Adelite (registered trademark) AT series, manufactured by ADEKA Corporation, and the like.

In the present invention, the surface modified silica fine particles can be prepared by any method. For example, it can be prepared by subjecting the above-described silica fine particles in a surface modification step as described below. The surface modification step is carried out by adding a silane compound represented by the following formula (2):

(wherein
$R^3$ is a linear, branched or cyclic, alkyl group or alkenyl group having 1 to 20 carbon atoms or an aryl group having 6 to 20 carbon atoms, where one or more methylene may be replaced by oxygen, or one or more hydrogen may be replaced by fluorine, $R^4$ is hydrogen or an alkyl group having 1 to 10 carbon atoms, preferably an alkyl group having 1 to 6 carbon atoms, more preferably an alkyl group having 1 to 5 carbon atoms, and m represents 0 to 3), to the above silica fine particles aqueous dispersion.

The silane compounds represented by the formula (2) are: in the case of m=0, tetraalkoxysilane; in the case of m=1, trialkoxyalkylsilane, trialkoxyalkenylsilane or trialkoxyarylsilane; in the case of m=2, dialkoxydialkylsilane, dialkoxydialkenylsilane, dialkoxydiarylsilane, dialkoxyalkylalkenylsilane or dialkoxyalkylarylsilane; and in the case of m=3, alkoxytrialkylsilane, alkoxytrialkenylsilane, alkoxytriarylsilane, alkoxydialkylalkenylsilane or alkoxydialkylarylsilane, and the like. Such a silane compound includes methoxytrimethylsilane, methoxytriethylsilane, methoxytripropylsilane, methoxytributylsilane, ethoxytripropylsilane, ethoxytributylsilane, propoxytrimethylsilane, methoxymethyldiethylsilane, methoxy(dimethyl)butylsilane, methoxy(dimethyl)octylsilane, methoxy(dimethyl)decylsilane, methoxy(dimethyl)tetradecylsilane, methoxy(dimethyl)octadecylsilane, trimethoxyvinylsilane, trimethoxyallylsilane, diethoxydivinylsilane, diethoxymethylvinylsilane, ethoxydimethylvinylsilane, trimethoxyphenylsilane, 4-methylphenyltrimethoxysilane, ethoxydimethoxyphenylsilane, dimethoxydiphenylsilane, methoxytriphenylsilane, tetramethoxysilane, tetraethoxysilane, tetrapropoxysilane, tetrabutoxysilane, and the like, but it is not limited thereto. Further, as the silane compound to be used in the surface modification step, the silane compound represented by the formula (2) may be used in combination of two or more thereof.

The amount of the silane compound to be used in the surface modification step can be appropriately selected depending on the type of the silane compound, but it is preferable to add an amount of about 2 to 20 times, in a molar ratio, of the number of OH groups (which mean, for example, OH groups derived from a silanol group) present on the surface of the silica fine particles. Here, the number of OH groups present on the surface of the silica fine particles can be measured by the method described in, for example, the literature by Iler, "The Chemistry of Silica: Solubility, Polymerization, Colloid and Surface Properties and Biochemistry of Silica" written by Ralph K. Iler and published by John Wiley & Sons, Inc. in 1979. In this literature, it has been described that 4 to 5 OH groups are present per 1 $nm^2$ (100 $Å^2$) of silica surface. Therefore, conforming to this method, when a spherical silica having a diameter of 25 nm (radius r=25 nm/2) is used, a value of surface area (S=4 $nr^2$) is calculated and 4 to 5 times of this value can be made the number of OH groups (silanol groups). In addition, according to this literature, on the surface of the amorphous silica treated with high temperature, about 4.6 of OH groups per 1 $nm^2$ is generally observed, so that when silica particles are used in the present specification, a value obtained by multiplying the spherical silica surface area by 4.6 is made the number of OH groups (silanol groups).

The surface modification step may be carried out at room temperature, but it may be performed by heating if necessary. Further, from the viewpoint of promotion and homogenization of the reaction, it is preferable to stir with a magnetic stirrer or the like. In addition, the time to perform the surface modification step can be appropriately selected depending on temperature and amount of the silica fine particles to be used.

Surface of the silica fine particles dispersed in a dispersion medium is modified by the above-described surface modification step. At least a part of or all the OH groups present on the surface of the silica fine particles react with the silane compound represented by the above formula (2) and a functional group represented by the general formula (3) is formed on at least a part of the silica fine particle surface:

$$—(O)_k SiR^3{}_m(OR^5)_l \qquad (3)$$

(wherein $R^3$ is a linear, branched or cyclic, alkyl group or alkenyl group having 1 to 20 carbon atoms or an aryl group having 6 to 20 carbon atoms, where one or more methylene may be replaced by oxygen, or one or more hydrogen may be replaced by fluorine, $R^5$ is hydrogen or an alkyl group having 1 to 10 carbon atoms, preferably an alkyl group having 1 to 6 carbon atoms, more preferably an alkyl group having 1 to 5 carbon atoms, k+l+m=4, k=1 to 3, and m=0 to 3).

Figure 1:
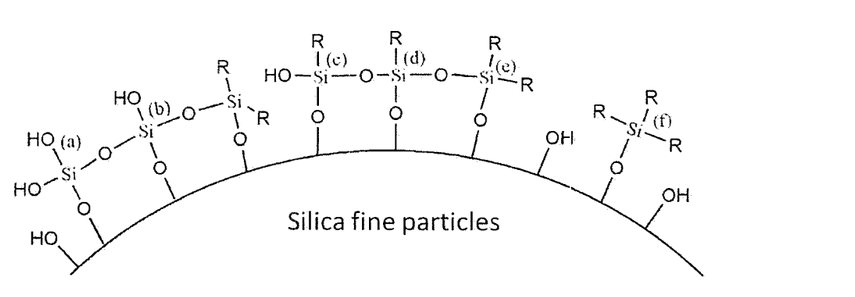
FIG. 1 is a diagram schematically illustrating the surface of the surface modified silica fine particles used in the present invention.

At the time of reaction, it is preferred that the group ($OR^4$) in the compound of formula (2) is hydrolyzed by water to become an OH group. Here, in the case of m=0, among the four OH groups bonded to a silicon atom, one is bonded to an OH group of the silica fine particle surface through dehydration condensation reaction and the remaining three OH groups are condensed with OH groups derived from other adjacent silanol groups and partially oligomerized, or remain as OH groups as they are without reacting (see (a) or (b) in FIG. 1). In the case of m=1, among the three OH groups bonded to a silicon atom, one is bonded to an OH group of the silica fine particle surface through dehydration condensation reaction and the remaining two OH groups are condensed with OH groups derived from other adjacent silanol groups and partially oligomerized, or remain as OH groups as they are without reacting (see (c) or (d) in FIG. 1). Similarly, in the case of m=2, one of the two OH groups bonded to a silicon atom is bonded to an OH group of the silica fine particle surface through dehydration condensation reaction and the remaining one OH group is condensed with an OH group derived from other adjacent silanol group and partially oligomerized, or remains as an OH group as it is without reacting (see (e) in FIG. 1). Further, in the case of m=3, since OH group is one, the OH group is bonded to an OH groups of the silica fine particle surface through dehydration condensation reaction (see (f) in FIG. 1). Further, in addition to the above, there may be cases where m is 0, 1, or 2 and all OH groups remain unreacted, and the like. At this time, each functional group is bonded to the silica fine particle surface as —O—Si(OH)$_3$, —O—SiR(OH)$_2$ or —O—SiR$_2$(OH). Further, although a case where the group ($OR^5$) is an OH group has been described, all the group ($OR^5$) are not OH groups and some or all of them may be the group ($OR^4$) without being hydrolyzed. After the surface modification step, since affinity of the silica fine particle surface to the organic dispersion medium is improved, extraction with any organic solvent is possible.

Surface analysis after the surface modification can be confirmed by the spectral data, such as FT-IR, $^{29}$Si—NMR and $^{13}$C-NMR, or TG-DTA analysis. Further, alternatively, by comparing the number of OH groups on the silica fine particle surface before and after the surface modification treatment, it is also possible to confirm that the OH groups have reacted. For example, it can be carried out by a method described in JP H6-92621 A using FT-IR (FT/IR-4000, manufactured by JASCO Corporation). Specifically, by comparing the FT-IR absorption spectrum of the silica particles before and after the surface modification and observing the change at the peak (3400 to 3500 cm$^{-1}$) derived from Si—OH, it is possible to determine whether the silica fine particle surface is modified with the silane compound represented by the above formula (2).

<(IV) Thermal Base Generator>

The composition for a black matrix according to the present invention comprises a thermal base generator. The thermal base generator is one that generates a base upon post-baking. The base generated by light or heat is believed to contribute to the condensation reaction of the siloxane polymer at the time of post-baking.

Although the optimum amount varies depending on type and amount of the active material that is generated by decomposition, required photosensitivity and dissolution contrast between the exposed portion and the unexposed portion, the addition amount of the present compound is preferably 0.1 to 10 parts by mass, more preferably 0.5 to 3 parts by mass, based on 100 parts by mass of the total mass of siloxane polymer. If the addition amount is less than 0.1 parts by mass, the amount of acid or base to be generated is too small, polymerization during the post-baking is not accelerated, and pattern reflow becomes to be easily caused. On the other hand, if the addition amount is more than 10 parts by mass, cracks may occur in the film to be formed. Further, increased addition amount causes deterioration of electric insulation and release of gas, of the cured product by thermal decomposition, which may become a problem in the subsequent steps.

Examples of said heat base generator include compounds that generate a base, such as imidazole, tertiary amine, quaternary ammonium, and mixtures thereof. Examples of bases to be released include imidazole derivatives, such as N-(2-nitrobenzyloxycarbonyl)imidazole, N-(3-nitrobenzyloxycarbonyl)imidazole, N-(4-nitrobenzyloxycarbonyl)imidazole, N-(5-methyl-2-nitrobenzyloxycarbonyl)imidazole and N-(4-chloro-2-nitrobenzyloxycarbonyl)imidazole; 1,8-diazabicyclo(5,4,0)undecene-7; and the like. These base generators can, like the acid generators, be used singly or in combination.

<(V) Solvent>

Examples of the solvent include ethylene glycol monoalkyl ethers, such as ethylene glycol monomethyl ether, ethylene glycol monoethyl ether, ethylene glycol monopropyl ether and ethylene glycol monobutyl ether; diethylene dialkyl ethers, such as diethylene glycol dimethyl ether, diethylene glycol diethyl ether, diethylene glycol dipropyl ether and diethylene glycol dibutyl ether; ethylene glycol alkyl ether acetates, such as methyl cellosolve acetate and ethyl cellosolve acetate; propylene glycol monoalkyl ethers, such as propylene glycol monomethyl ether (PGME) and propylene glycol monoethyl ether; propylene glycol alkyl ether acetates, such as propylene glycol monomethyl ether acetate (PGMEA), propylene glycol monoethyl ether acetate and propylene glycol monopropyl ether acetate; aromatic hydrocarbons, such as benzene, toluene and xylene; ketones, such as methyl ethyl ketone, acetone, methyl amyl ketone, methyl isobutyl ketone and cyclohexanone; and the like. These solvents are used individually or in combination of two or more, respectively. Blending ratio of the solvent varies depending on coating method or requirement of the film thickness after the coating. For example, in the case of spray coating, the ratio becomes 90 mass % or more based on the total mass of the siloxane polymer and optional components, but in the case of slit coating of a large glass substrate used for manufacturing a display, it is usually 50 mass % or more, preferably 60 mass % or more, and usually 90 mass % or less, preferably 85 mass % or less.

Although the composition according to the present invention comprises aforementioned (I) to (V) as essential, it may be combined with further compounds as needed. These materials that can be combined are described in the following. In addition, components other than the (I) to (V) in the entire composition is preferably 10% or less, more preferably 5% or less, based on the total mass.

<Optional Components>

Further, the composition for a black matrix according to the present invention may contain other optional components as needed. Such components include a photosensitizer and a surfactant.

To improve the coating properties, it is preferable to use a surfactant. The surfactant which can be used in the composition for a black matrix of the present invention include nonionic surfactants, anionic surfactants, ampholytic surfactants, and the like.

Examples of the above nonionic surfactant include, polyoxyethylene alkyl ethers, such as polyoxyethylene lauryl ether, polyoxyethylene oleyl ether and polyoxyethylene cetyl ether; polyoxyethylene fatty acid diester; polyoxyethylene fatty acid monoester; polyoxyethylene polyoxypropylene block polymer; acetylene alcohol; acetylene glycol; polyethoxylate of acetylene alcohol; acetylene glycol derivatives, such as polyethoxylate of acetylene glycol; fluorine-containing surfactants, for example, FLUORAD (trade name, manufactured by Sumitomo 3M Limited), MEGAFAC (trade name: manufactured by DIC Cooperation), SURFLON (trade name, manufactured by Asahi Glass Co. Ltd.); or organosiloxane surfactants, for example, KP341 (trade name, manufactured by Shin-Etsu Chemical Co., Ltd.), and the like. Examples of said acetylene glycol include 3-methyl-1-butyne-3-ol, 3-methyl-1-pentyn-3-ol, 3,6-dimethyl-4-octyne-3,6-diol, 2,4,7,9-tetramethyl-5-decyne-4,7-diol, 3,5-dimethyl-1-hexyne-3-ol, 2,5-dimethyl-3-hexyne-2,5-diol, 2,5-dimethyl-2,5-hexane-diol, and the like.

Further, examples of the anionic surfactant include ammonium salt or organic amine salt of alkyl diphenyl ether disulfonic acid, ammonium salt or organic amine salt of alkyl diphenyl ether sulfonic acid, ammonium salt or organic amine salt of alkyl benzene sulfonic acid, ammonium salt or organic amine salt of polyoxyethylene alkyl ether sulfuric acid, ammonium salt or organic amine salt of alkyl sulfuric acid, and the like.

Further, examples of the amphoteric surfactant include 2-alkyl-N-carboxymethyl-N-hydroxyethyl imidazolium betaine, lauric acid amide propyl hydroxysulfone betaine, and the like.

These surfactants can be used individually or in combination of two or more, and the blending ratio thereof is usually 50 to 10,000 ppm, preferably 100 to 5,000 ppm, based on the total mass of the composition for a black matrix.

Further, it is also possible to impart photosensitivity to the composition for a black matrix according to the present invention by adding a photosensitizer. By selecting the type of the photosensitizer, it is possible to make the composition for a black matrix according to the present invention function as either a positive type photosensitive composition or a negative type photosensitive composition.

The composition for a black matrix according to the present invention comprising the above-described (I) black colorant, (II) siloxane polymer, (III) surface modified silica fine particles, (IV) thermal base generator, and (V) solvent is suitable for manufacturing a black matrix, which is suitable for a high luminance device structure and has high heat resistance and high light-shielding properties, and production thereof is also simple. Although due to a thermal stability problem of resin or dispersing agent, heat resistance of conventional composition for a black matrix was only up to about 200° C., the siloxane polymer and silica fine particles of high thermal stability are used in the present invention, and deterioration of light-shielding properties and insulating properties caused by aggregation of the carbon black even at 300° C. or higher is reduced since the silica fine particles are presumed to be present between the carbon black particles. That is, if the composition for a black matrix according to the present invention is used and a dispersing agent is contained therein, it is considered that the surface modified silica fine particles prevent aggregation of the carbon black even though the dispersing agent is decomposed at around 200° C., so that the composition can withstand up to higher temperature. Further, even though no dispersing agent is contained, due to presence of the surface modified silica fine particles, aggregation of the carbon black particles can be prevented. So far, although a film on a carbon surface and a black pigment in which silica is composed as a core have been proposed as an example of use of the insulating fine particles such as silica fine particles, it had a problem such as complicated synthesis. Further, although there has been a proposal improving contrast by mixing a color filter pigment and a transparent silica fine particles, any proposal as a black matrix has not been performed. Although an array substrate prepared by coating a black matrix using BCB of high heat resistance and stabilizing through flattening and protection and forming a thin film transistor thereon has been proposed, no particular remark has been made about heat resistance of the black matrix material. Although even a black matrix having low heat resistance can be used in the case of a thin film transistor array to be formed at a relatively low temperature process (300° C.), such as amorphous silicon, it is difficult to be applied to oxide semiconductor and low-temperature polysilicon semiconductor, which need further high-temperature process. Therefore, it can be said that the effect of the composition for a black matrix according to the present invention is remarkable effect beyond the range that can be predicted, in view of the level of technique regarding conventional compositions for a black matrix.

[Black Matrix]

The black matrix according to the present invention can be formed in any manner using the above-described composition for a black matrix. Preferably, the composition for a black matrix is applied on a substrate and cured, and thereafter a pattern is formed by etching as necessary. Although the substrate to be used is not particularly limited, it includes various substrates such as a silicon substrate, a glass plate, a metal plate, a ceramic plate, and the like. In particular, an array substrate of liquid crystal display, or the like is a preferable one as the substrate for the present invention. The coating method is not particularly limited, and various methods such as a spin coating method, a dip coating method, a knife coating method, a roll coating method, a spray coating method, a slit coating method, and the like can be adopted. Alternatively, when coating, it is also possible to print the composition for a black matrix to make a desired pattern.

The coating film thus formed on the substrate is pre-baked as necessary. The pre-baking temperature is adjusted depending on the type of the organic solvent contained in the composition. In general, when the temperature is too low, the residual organic solvent in the coating film becomes more, and this sometimes causes to invade a substrate transporting apparatus or the like. On the other hand, when the temperature is too high, the coating film is suddenly dried to cause uneven coating. Therefore, the pre-baking temperature is preferably 60 to 200° C., further preferably 80 to 150° C. The pre-baking can be carried out using a heating apparatus such as a hot plate or an oven, and the pre-baking time varies depending on the type of the used organic solvent and temperature of the pre-baking, but is preferably 30 seconds to 10 minutes, further preferably 1 minute to 5 minutes.

The coating film, which is pre-baked as necessary, is cured. The temperature at the time of curing can be freely selected if it is the temperature at which the coating film is cured. However, if the temperature is too low, the reaction sometimes does not proceed sufficiently, and the curing may not be performed sufficiently. Therefore, it is preferred that the temperature is 150° C. or higher. However, by adding a curing agent as an additive, curing can be fully performed even at around 150° C. Further, the OH group has polarity, dielectric constant tends to become higher when OH groups remain. Therefore, if dielectric constant of the siliceous film is desired to be maintained lower, it is more preferable to perform the curing at a higher temperature, specifically at 200° C.: or higher. Further, on the contrary, since the thermal energy cost increases if the temperature is too high, this is not preferable. Therefore, it is preferable that the temperature is 450° C. or lower, more preferably 350° C. or lower. Further, although the time is not particularly limited, it is preferably 15 minutes to 3 hours. Since cracks become easy to occur in the film if the time is too long, this needs attention. Further, although the treatment is generally carried out in the atmosphere, it can be carried out also under an inert gas atmosphere such as nitrogen, helium and argon, if necessary. Further, the heating apparatus is not particularly limited, and for example, a hot plate, an oven, or the like can be used.

After curing, if necessary, the black matrix is subjected to patterning by etching. Although as the etching method, there are a dry etching method and a wet etching method, it can be freely selected according to the application. In the case where the composition for a black matrix is printed to make a desired pattern at the time of coating, this etching step can be omitted. Further, when the composition for a black matrix contains a photosensitizer and has photosensitivity, a desired pattern can be obtained by performing exposure and alkali aqueous solution treatment, instead of the etching treatment.

Since the black matrix according to the present invention has high heat resistance, even if it is formed on the array substrate side, the light-shielding properties and insulating properties of the black matrix itself do not deteriorate, and good light-shielding properties and insulating properties are maintained.

[Evaluation of Black Matrix]

Evaluation of physical properties of the black matrix according to the present invention can be carried out as described below.

<Light-Shielding Properties>

Carrying out the measurement using a UV-Vis spectrophotometer Cary-4000, light-shielding properties can be evaluated by measuring transmittance of the light having a wavelength of 400 nm.

<Electric Resistance>

Carrying out the measurement of electric resistance using a high performance resistivity meter MCP-HT800, the surface resistivity at an applied voltage of 1,000V was evaluated by the MCC-B method. The sheet resistance value after pre-baking in any composition (below-described, Examples A1 to A9 and Comparative Example A1) exceeds $1.0 \times 10^{15}$, and it shall be assessed as having heat resistance when the surface resistivity value after being cured does not decrease.

EXAMPLES

The present invention is more specifically explained below by use of the following examples.

Preparation Example 1 (Surface Modification of Silica Particles)

With respect to silica sol SE-1550 (trade name, manufactured by Merck), replacement of the dispersion medium was conducted from an aqueous dispersion medium liquid to a propylene glycol monomethyl ether (PGME) dispersion having the same concentration. Into a three neck flask, 30 g of the SE-1550, dispersion of which was replaced with PGME, and 0.15 g of water were fed. Then, while heating them to 60° C., 6 g of trimethoxypropylsilane (Pr—Si(OMe)$_3$) was added dropwise and the reaction was performed for 4 hours. This was concentrated using an evaporator to complete the surface modification.

Preparation Example 2 (Surface Modification of Silica Particles)

The surface modification of silica particles was conducted in the same way as in Preparation Example 1 except that Klebosol 30H50 (trade name, manufactured by Merck) was used instead of SE-1550 as the silica sol.

Preparation Example 3 (Surface Modification of Silica Particles)

The surface modification of silica particles was conducted in the same way as in Preparation Example 1 except that Klebosol 20H12 (trade name, manufactured by Merck) was used instead of SE-1550 as the silica sol.

Preparation Example 4 (Surface Modification of Silica Particles)

The surface modification of silica particles was conducted in the same way as in Preparation Example 1 except that Klebosol 30H50 (trade name, manufactured by Merck) was used instead of SE-1550 as the silica sol and that methoxytrimethylsilane (Me$_3$-Si(OMe)) was used as the surface modifier.

Preparation Example 5 (Surface Modification of Silica Particles)

The surface modification of silica particles was conducted in the same way as in Preparation Example 1 except that Klebosol 30H50 (trade name, manufactured by Merck) was used instead of SE-1550 as the silica sol and that a mixture of methoxytrimethylsilane (Me$_3$-Si(OMe)) and trimethoxyvinylsilane (CH$_2$=CH—Si(OMe)$_3$) (mixing ratio, 80:20) was used as the surface modifier.

Preparation Example 6 (Surface Modification of Silica Particles)

The surface modification of silica particles was conducted in the same way as in Preparation Example 1 except that Klebosol 30H50 (trade name, manufactured by Merck) was used instead of SE-1550 as the silica sol and that a mixture of trimethoxypropylsilane (Pr—Si(OMe)$_3$) and trimethoxyvinylsilane (CH$_2$=CH—Si(OMe)$_3$) (mixing ratio, 80:20) was used as the surface modifier.

Preparation Example 7 (Surface Modification of Silica Particles)

The surface modification of silica particles was conducted in the same way as in Preparation Example 1 except that Klebosol 20H12 (trade name, manufactured by Merck) was used instead of SE-1550 as the silica sol and that methoxytrimethylsilane (Me$_3$-Si(OMe)) was used as the surface modifier.

Preparation Example 8 (Surface Modification of Silica Particles)

The surface modification of silica particles was conducted in the same way as in Preparation Example 1 except that Klebosol 20H12 (trade name, manufactured by Merck) was used instead of SE-1550 as the silica sol and that trimethoxymethylsilane (Me-Si(OMe)$_3$) was used as the surface modifier.

Preparation Example 9 (Surface Modification of Silica Particles)

The surface modification of silica particles was conducted in the same way as in Preparation Example 1 except that Klebosol 30H9 (trade name, manufactured by Merck) was used instead of SE-1550 as the silica sol and that trimethoxypropylsilane (Pr—Si(OMe)$_3$) was used as the surface modifier.

The following table shows the details of the surface modified silica fine particles obtained in Preparation Examples 1 to 9.

TABLE 1

| Sample name | Material | Volume average particle diameter (nm) | Surface modifier | Solid content (%) | Dispersion medium |
|---|---|---|---|---|---|
| Preparation Example 1 | SE-1550 | 150 | Pr—Si(OMe)$_3$ | 21 | PGME |
| Preparation Example 2 | Klebosol30H50 | 85 | Pr—Si(OMe)$_3$ | 40 | PGME |

TABLE 1-continued

| Sample name | Material | Volume average particle diameter (nm) | Surface modifier | Solid content (%) | Dispersion medium |
|---|---|---|---|---|---|
| Preparation Example 3 | Klebosol20H12 | 20 | Pr—Si(OMe)$_3$ | 38 | PGME |
| Preparation Example 4 | Klebosol30H50 | 85 | Me$_3$—Si(OMe) | 21 | PGME |
| Preparation Example 5 | Klebosol30H50 | 85 | Me$_3$—Si(OMe):CH$_2$=CH—Si(OMe)$_3$ = 80:20 | 31 | PGME |
| Preparation Example 6 | Klebosol30H50 | 85 | Pr—Si(OMe)$_3$:CH$_2$=CH—Si(OMe)$_3$ = 80:20 | 41 | PGME |
| Preparation Example 7 | Klebosol20H12 | 20 | Me$_3$—Si(OMe) | 17 | PGME |
| Preparation Example 8 | Klebosol20H12 | 20 | Me—Si(OMe)$_3$ | 28 | PGME |
| Preparation Example 9 | Klebosol30H9 | 10 | Pr—Si(OMe)$_3$ | 20 | PGME |

Synthesis Example 1 (Synthesis of Siloxane Polymer A)

Into a four neck flask, 107 g of methyltriethoxysilane, 96 g of phenyltriethoxysilane and 300 g of PGMEA were fed and dissolved. Then, 48 g of 44% aqueous sodium hydroxide solution was added and stirred at 500 rpm for two hours. Then, it was neutralized with aqueous acetic acid and stirred for 1 hour. Thereafter, the reaction solution was transferred to a separation funnel and allowed to stand for 30 minutes, thus making an organic solvent phase and an aqueous phase separated. The aqueous phase was discarded, 100 g of pure water was newly added into the organic solvent phase in the separatory funnel and the phase was shaken, an alkali component and water soluble components remaining in the organic solvent phase were extracted and washed. This washing operation was performed three times. Thereafter, the organic solvent phase washed with pure water was collected. As a result of measurement of the molecular weight of the siloxane polymer A contained in the organic solvent phase, the number average molecular weight was 1,200 and the mass average molecular weight was 1,700, in terms of polystyrene.

Example A1 (Preparation of Composition for Black Matrix)

The siloxane polymer A, the PGME dispersion of surface modified silica particles obtained in Preparation Example 1 and a black colorant were mixed to make the composition mass ratio of solids 20:10:10. Here, as the black colorant, TSBK-007 (trade name, manufactured by Taisei Kako Co., Ltd.) comprising a carbon black having a volume average particle diameter of 100 nm and a dispersing agent was used. Further, by adding 0.1 parts by mass of AKS-10 (trade name, manufactured by Shin-Etsu Chemical Co., Ltd.) as the surfactant and 0.025 parts by mass of thermal base generator 1,8-diazabicyclo(5,4,0)undecene-7-orthophthalic acid salt (trade name, manufactured by San-Apro Ltd.) as the catalyst, based on the total solid content of 100 parts by mass, and adjusting the mixture to be a PGMEA solution of 35% total solid content, and a composition for a black matrix was obtained.

Example A2 (Preparation of Composition for Black Matrix)

The preparation of a composition for a black matrix was conducted in the same way as in Example A1 except that the PGME dispersion of surface modified silica particles obtained in Preparation Example 2 was used.

Example A3 (Preparation of Composition for Black Matrix)

The preparation of a composition for a black matrix was conducted in the same way as in Example A1 except that the PGME dispersion of surface modified silica particles obtained in Preparation Example 3 was used.

Example A4 (Preparation of Composition for Black Matrix)

The preparation of a composition for a black matrix was conducted in the same way as in Example A1 except that the PGME dispersion of surface modified silica particles obtained in Preparation Example 4 was used.

Example A5 (Preparation of Composition for Black Matrix)

The preparation of a composition for a black matrix was conducted in the same way as in Example A1 except that the PGME dispersion of surface modified silica particles obtained in Preparation Example 5 was used.

Example A6 (Preparation of Composition for Black Matrix)

The preparation of a composition for a black matrix was conducted in the same way as in Example A1 except that the PGME dispersion of surface modified silica particles obtained in Preparation Example 6 was used.

Example A7 (Preparation of Composition for Black Matrix)

The preparation of a composition for a black matrix was conducted in the same way as in Example A1 except that the PGME dispersion of surface modified silica particles obtained in Preparation Example 7 was used.

Example A8 (Preparation of Composition for Black Matrix)

The preparation of a composition for a black matrix was conducted in the same way as in Example A1 except that the PGME dispersion of surface modified silica particles obtained in Preparation Example 8 was used.

Example A9 (Preparation of Composition for Black Matrix)

The preparation of a composition for a black matrix was conducted in the same way as in Example A1 except that the PGME dispersion of surface modified silica particles obtained in Preparation Example 9 was used and that a carbon black having a volume average particle diameter of 200 nm and a dispersing agent were used as the black colorant.

COMPARATIVE EXAMPLE

Comparative Example A1 (Preparation of Composition for Black Matrix)

A siloxane polymer A and a black colorant were mixed to make the solid content mass ratio to be 30:10. Here, as the black colorant, the same as that used in Example A1 was used. Further, by adding 0.1 parts by mass of AKS-10 (trade name, manufactured by Shin-Etsu Chemical Co., Ltd.) as the surfactant and 0.025 parts by mass of thermal base generator 1,8-diazabicyclo(5,4,0)undecene-7-orthophthalic acid salt (trade name, manufactured by San-Apro Ltd.) as the catalyst, based on the total solid content of 100 parts by mass, and adjusting the mixture to be a PGMEA solution of 35% total solid content, and a composition for a black matrix was obtained.

Comparative Example B1: Formation of Black Matrix

Using the composition for a black matrix obtained in Comparative Example A1, a black matrix was formed on a glass substrate (EAGLE XG (registered trademark), manufactured by Corning). At that time, the composition for a black matrix was coated on the glass substrate and prebaked on a hot plate at 130° C. for 90 seconds.

Comparative Example B2: Formation of Black Matrix

A black matrix was formed in the same manner as in Comparative Example B1 except that the curing treatment was conducted at 180° C. for 1 hour in the air after prebaking.

Comparative Example B3: Formation of Black Matrix

A black matrix was formed in the same manner as in Comparative Example B2 except that the temperature of the curing treatment was 200° C.

Comparative Example B4: Formation of Black Matrix

A black matrix was formed in the same manner as in Comparative Example B2 except that the temperature of the curing treatment was 230° C.

Comparative Example B5: Formation of Black Matrix

A black matrix was formed in the same manner as in Comparative Example B2 except that the temperature of the curing treatment was 250° C.

Comparative Example B6: Formation of Black Matrix

A black matrix was formed in the same manner as in Comparative Example B2 except that the curing treatment was conducted at the temperature of 250° C. for 1 hour and further at 350° C. for 1 hour.

For Comparative Examples B1 to 5, the sheet resistance was measured, and the results thereof were summarized in the following table.

TABLE 2

| Sample No. | Curing temperature (° C.) | Sheet resistance ($\Omega$/sq.) |
|---|---|---|
| Comparative Example B1 | without curing | >1.0 × 10$^{15}$ |
| Comparative Example B2 | 180 | >1.0 × 10$^{15}$ |
| Comparative Example B3 | 200 | 3.7 × 10$^{13}$ |
| Comparative Example B4 | 230 | 6.2 × 10$^{12}$ |
| Comparative Example B5 | 250 | 1.2 × 10$^{12}$ |
| Comparative Example B6 | 250 + 350 | 3.8 × 10$^{9}$ |

Compared to Comparative Example B1, which is for before the curing treatment, it was confirmed that, in Comparative Examples B2 to B6, the higher the curing treatment temperature is, the lower the sheet resistance deteriorates.

Example B1: Formation of Black Matrix

Using the composition for a black matrix obtained in Example A1, a black matrix was formed on a glass substrate (EAGLE XG (registered trademark), manufactured by Corning). At that time, the composition for a black matrix was coated on the glass substrate and prebaked on a hot plate at 130° C. for 90 seconds, and then, in the same manner in Comparative Example B6, the curing treatment was conducted at 250° C. for 1 hour in the air and further 350° C. for 1 hour in the air.

Example B2: Formation of Black Matrix

Using the composition for a black matrix obtained in Example A2, a black matrix was formed on a glass substrate in the same manner as in Example B1.

Example B3: Formation of Black Matrix

Using the composition for a black matrix obtained in Example A3, a black matrix was formed on a glass substrate in the same manner as in Example B1.

Example B4: Formation of Black Matrix

Using the composition for a black matrix obtained in Example A4, a black matrix was formed on a glass substrate in the same manner as in Example B1.

Example B5: Formation of Black Matrix

Using the composition for a black matrix obtained in Example A5, a black matrix was formed on a glass substrate in the same manner as in Example B1.

Example B6: Formation of Black Matrix

Using the composition for a black matrix obtained in Example A6, a black matrix was formed on a glass substrate in the same manner as in Example B1.

Example B7: Formation of Black Matrix

Using the composition for a black matrix obtained in Example A7, a black matrix was formed on a glass substrate in the same manner as in Example B1.

Example B8: Formation of Black Matrix

Using the composition for a black matrix obtained in Example A8, a black matrix was formed on a glass substrate in the same manner as in Example B1.

Example B9: Formation of Black Matrix

Using the composition for a black matrix obtained in Example A9, a black matrix was formed on a glass substrate in the same manner as in Example B1.

The sheet resistance and transmittance of the black matrix obtained in Examples B1 to 9 and Comparative Example B6 were measured respectively using a high performance resistivity meter and UV-Vis spectrophotometer, and the results thereof were summarized in the following table.

TABLE 3

| Sample name | Volume average particle diameter of surface modified silica fine particles (nm) | Ratio of particle diameter Carbon black: Surface modified silica fine particle | Sheet resistance ($\Omega$/sq.) | Transmittance (%) |
|---|---|---|---|---|
| Comparative Example B6 | — | — | $3.76 \times 10^9$ | 2 |
| Example B1 | 150 | 1:1.5 | $4.64 \times 10^{10}$ | 1.6 |
| Example B2 | 85 | 1:0.85 | $2.41 \times 10^{12}$ | 1.4 |
| Example B3 | 20 | 1:0.2 | $>1.0 \times 10^{15}$ | 1.5 |
| Example B4 | 85 | 1:0.85 | $>1.0 \times 10^{15}$ | 1.2 |
| Example B5 | 85 | 1:0.85 | $>1.0 \times 10^{15}$ | 1.3 |
| Example B6 | 85 | 1:0.85 | $2.95 \times 10^{12}$ | 1.5 |
| Example B7 | 20 | 1:0.2 | $>1.0 \times 10^{15}$ | 1.4 |
| Example B8 | 20 | 1:0.2 | $>1.0 \times 10^{15}$ | 1.5 |
| Example B9 | 10 | 1:0.05 | $>1.0 \times 10^{15}$ | 1.7 |

It was confirmed that in the compositions comprising surface modified silica particles, decrease of the sheet resistance is small also after high temperature curing treatment.

The invention claimed is:

1. A composition for a black matrix comprising:
   (I) a black colorant comprising carbon black having a volume average particle diameter of 1 to 300 nm;
   (II) a siloxane polymer having repeating units represented by the general formulae (Ia), (Ib) and/or (Ic)

(wherein
$R^1$ is a linear, branched or cyclic, alkyl group or alkenyl group having 1 to 10 carbon atoms or an aryl group having 6 to 20 carbon atoms, where one or more methylene may be replaced by oxygen, or one or more hydrogen may be replaced by fluorine,
the ratio x of the general formula (Ia) in all of the repeating units is 0 mol % or more and 30 mol % or less, the ratio y of the general formula (Ib) in all of the repeating units is 50 mol % or more and 100 mol % or less, and the ratio z of the general formula (Ic) in all of the repeating units is 0 mol % or more and 30 mol % or less);
   (III) surface modified silica fine particles having, on at least a part of the surface, a functional group represented by the general formula (3):

$$—(O)_k SiR^3{}_m (OR^5)_l \qquad (3)$$

(wherein
$R^3$ represents a linear, branched or cyclic, alkyl group or alkenyl group having 1 to 20 carbon atoms or an aryl group having 6 to 20 carbon atoms, where one or more methylene may be replaced by oxygen, or one or more hydrogen may be replaced by fluorine
$R^5$ represents hydrogen or an alkyl group having 1 to 10 carbon atoms,
$k+l+m=4$, $k=1$ to 3, and $m=0$ to 3)
and having a volume average particle diameter of 1 to 300 nm;
   (IV) a thermal base generator; and
   (V) a solvent.

2. The composition according to claim 1, wherein the ratio of the volume average particle diameter of said carbon black to that of said surface modified silica fine particles is 1:0.05 to 1:3.

3. The composition according to claim 1, wherein the mass ratio of said black colorant to said siloxane polymer is in the range of the black colorant:the siloxane polymer=10:90 to 50:50.

4. The composition according to claim 1, wherein the mass ratio of said black colorant to said surface modified silica fine particles is in the range of the black colorant:the surface modified silica fine particles=10:90 to 90:10.

5. A method for manufacturing a black matrix comprising applying the composition according to claim 1 and curing.

6. The method according to claim 5 further comprising etching after curing.

7. A black matrix formed by the composition according to claim 1.

* * * * *